(12) United States Patent
Waters et al.

(10) Patent No.: US 12,124,393 B2
(45) Date of Patent: Oct. 22, 2024

(54) METHODS AND APPARATUS TO PREFORM INTER-INTEGRATED CIRCUIT ADDRESS MODIFICATION

(71) Applicant: Texas Instruments Incorporated, Dallas, TX (US)

(72) Inventors: Deric Wayne Waters, Dallas, TX (US); Xiaoxi Bruce Zhang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/587,695

(22) Filed: Jan. 28, 2022

(65) Prior Publication Data

US 2023/0244624 A1 Aug. 3, 2023

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0016* (2013.01)

(58) Field of Classification Search
CPC ............. G06F 13/4068; G06F 13/4282; G06F 2213/0016
USPC ...................................... 710/3, 8, 9, 33, 105
See application file for complete search history.

(56) References Cited

U.S. PATENT DOCUMENTS

| | | | | |
|---|---|---|---|---|
| 7,653,757 B1 * | 1/2010 | Fernald | ...................... | G06F 1/26 713/340 |
| 7,774,537 B2 * | 8/2010 | Pyeon | ................. | G06F 13/4243 710/52 |
| 2008/0126633 A1 * | 5/2008 | Dunstan | ............... | G06F 13/4291 710/100 |
| 2008/0183943 A1 * | 7/2008 | Bruce | .................. | G06F 12/0284 711/E12.002 |
| 2010/0115067 A1 * | 5/2010 | Brant | ................... | H04L 61/5092 709/221 |
| 2010/0306431 A1 | 12/2010 | Adkins et al. | | |

(Continued)

FOREIGN PATENT DOCUMENTS

EP 2725499 A1 4/2014

OTHER PUBLICATIONS

International Search Report dated May 15, 2023.

*Primary Examiner* — Farley Abad
*Assistant Examiner* — Henry W Yu
(74) *Attorney, Agent, or Firm* — Michelle F. Murray; Frank D. Cimino

(57) ABSTRACT

An example system includes: a device coupled to a data line, the device configured to: send a first command on the data line, the first command including a first address; after sending the first command, read a first value on the data line, the first value including data from a first target device and a second target device; responsive to reading the first value, send a second command including the first address and data representing the first value on the data line; send a third command on the data line, the third command including the first address; after sending the third command, read a second value on the data line, the second value including data from the first target device and the second target device; responsive to reading the second value, send a fourth command on the data line, the fourth command including the first address.

20 Claims, 5 Drawing Sheets

(56) References Cited

U.S. PATENT DOCUMENTS

| | | | |
|---|---|---|---|
| 2013/0046928 A1* | 2/2013 | Ramaraju | G06F 9/355 711/108 |
| 2015/0026374 A1* | 1/2015 | Decesaris | G06F 13/40 710/110 |
| 2017/0083468 A1* | 3/2017 | Sengoku | H04L 61/5092 |
| 2019/0108149 A1* | 4/2019 | Graif | G06F 13/4291 |

* cited by examiner

METHODS AND APPARATUS TO PREFORM INTER-INTEGRATED CIRCUIT ADDRESS MODIFICATION

TECHNICAL FIELD

This description relates generally to inter-integrated circuit addressing, and more particularly to methods and apparatus to preform inter-integrated circuit address configuration.

BACKGROUND

Inter-integrated circuit (I2C) protocol is a serial communication protocol typically used to communicate between a target device and a primary device. The primary device may be coupled to a plurality of target devices through a single I2C bus. The primary device communicates to each target device individually by sending a command (e.g., read command, write command) including a target device address. In order to implement I2C with multiple target devices on the same I2C bus, each target device has a different device address. In order to alter the device address, typically a connection is required between each target device and primary device in addition to being coupled to the I2C bus, which increases the number of pins required on the target device.

SUMMARY

For methods of I2C address resolution, an example system includes a data line; and a device coupled to the data line, the device configured to: send a first command on the data line, the first command including a first address; after sending the first command, read a first value on the data line, the first value including data from a first target device and a second target device; responsive to reading the first value, send a second command including the first address and data representing the first value on the data line; send a third command on the data line, the third command including the first address; after sending the third command, read a second value on the data line, the second value including data from the first target device and the second target device; responsive to reading the second value, send a fourth command on the data line, the fourth command including the first address; send a fifth command on the data line, the fifth command including a second address; and after sending the fifth command, read a third value on the data line, the third value including only data from the first target device.

DETAILED DESCRIPTION

Figure 1:
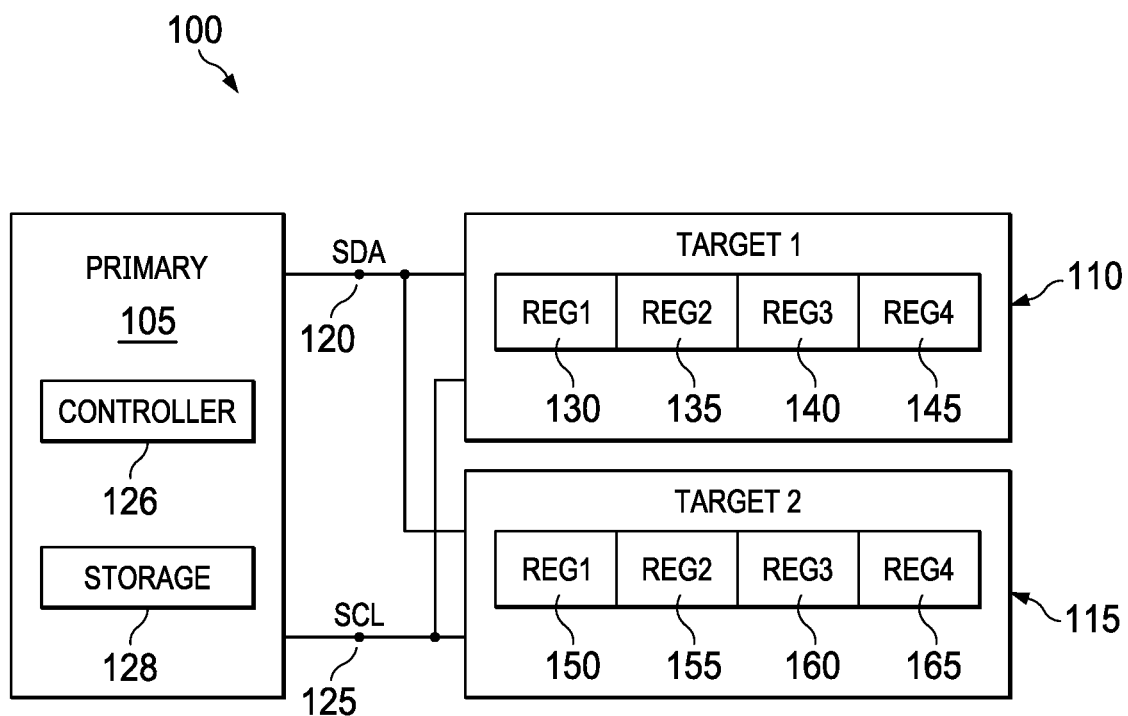
FIG. 1 is a block diagram of an example system configured to implement I2C communication between an example primary device, an example first target device, and a second target device to modify a device address of the target devices.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Inter-integrated circuit (I2C) protocol is a synchronous serial communication protocol typically used to communicate between a target device and a primary device. A typical I2C bus includes a data line (SDA) and a clock signal (SCL), which couple the target device(s) to the primary device. The primary device may be a processing circuit, an integrated circuit, a microcontroller, etc. The target device may be an integrated circuit, a sensor, a peripheral, etc. The primary device may be coupled to multiple target devices through a single I2C bus. In some applications, the same I2C bus is used to communicate between the primary device and a plurality of target devices.

The primary device may communicate to the target device by sending a command (e.g., read command, write command) including a device address of the target device. The primary device may set and/or read a value of a register within the target device using I2C commands. In one example, an I2C command is a synchronous serial data stream, on a serial data terminal, including a start bit, a device address, a read/write bit, a first acknowledge bit, a register address, a second acknowledge bit, and/or a stop bit. The primary device may communicate with an individual target device by sending an I2C command including the device address specific to that target device. In order to implement I2C with multiple target devices on the same I2C bus, the target devices must have different device addresses.

A device address is typically set during the target device manufacturing. In some applications, device manufacturers may use the same device address for all devices being manufactured. In I2C applications that implement a plurality of the same target devices on the same I2C bus, a I2C command with a target device address may result in a plurality of devices attempting to write to the serial data line and corrupting the data. In order to alter a target device address, typically a configuration terminal is provided on the target device(s), in addition to a serial data line terminal and a clock terminal comprising the I2C bus. The addition of the configuration pin increases the number of pins used by the I2C bus on the target device(s).

Examples described herein include an example method for I2C address modification using an I2C bus. The example method modifies the device addresses of a plurality of target device(s) of the same device address, such that the target devices determine and set separate device addresses without the use of a configuration pin.

The primary device may be configured to send a plurality of I2C commands to read and write to the target devices through the I2C bus. The target devices may be configured to determine and set the device address based on the commands received from the primary device through the I2C bus.

FIG. 1 is a block diagram of an example system 100 configured to implement I2C communication between an example primary device 105, an example first target device 110, and a second target device 115 to modify a device address of the target devices 105 and 110. In the example of FIG. 1, the system 100 includes the primary device 105, the first target device 110, the second target device 115, an example serial data line (SDA) 120, and an example serial clock line (SCL) 125.

The primary device 105 is coupled to the target devices 110 and 115 through the serial data line 120 and the serial clock line 125. The primary device 105 includes an example controller 126 and an example storage 128. In some example implementations, the primary device 105 may be a processing circuit, an integrated circuit, a microcontroller, etc. The primary device 105 is configured to generate a clock signal on the serial clock line 125, such that the devices 105-115 may communicate serial data using the same clock signal. The primary device 105 may transmit data to the devices 110 and 115 by driving the serial data line 120, such that the devices 110 and 115 may monitor the serial data line 120 to receive data from the primary device 105. The primary device 105 is configured for I2C protocol to communicate to the target devices 110 and 115. The controller 126 is configured to drive the serial data line 120, such that that primary device 105 may transmit and/or receive I2C commands on the serial data line 120. The primary device 105 may be coupled to the serial data line 120 by a general-purpose input output (GPIO) pin. The primary device 105 may be configured to supply a clock signal to the serial clock line 125. The primary device 105 is configured to transmit I2C commands to the target devices 110 and 115 by synchronously driving the serial data line 120. The primary device 105 may receive data from the target devices 110 and 115 by monitoring the serial data line 120 for an external driver. The storage 128 may be configured to store data received from the target devices 110 and 115, such that the controller 126 may be configured to transmit the received data to the target devices 110 and 115.

The first target device 110 is coupled to the primary device 105 and the second target device 115 through the serial data line 120 and the serial clock line 125. In some example implementations, the first target device 110 may be an integrated circuit, a sensor, a peripheral, etc. The first target device 110 may transmit data to the primary device 105 by driving the serial data line 120. The first target device 110 may receive data from the primary device 105 by monitoring the serial data line 120. The first target device includes an example first register 130, a second register 135, a third register 140, and a fourth register 145. Alternatively, the first target device 110 may include any plurality of registers configured to store any plurality of bits. The first target device 110 is configured to store an example first device address within the first register 130. For example, the first register 130 may be set to an 8-bit value representing the first device address. Alternatively, the device address may be stored and/or set to registers 135-145. The second register 135 may be configured to store an example first universally unique identifier (UUID). For example, the second register 135 may be set to a 32-bit value representing the first UUID of the first target device 110. The third register 140 may be configured to store an example first inverse UUID (UUID-bar). The first inverse UUID is configured to be a bitwise NOT of the first UUID. For example, the third register 140 may be set to the first inverse of the UUID stored in the second register 135. Alternatively, the first inverse UUID may be stored and/or set to the registers 130, 135, and/or 145. The fourth register 145 may be configured to store a second device address. For example, the fourth register 145 may be set to an 8-bit value representing the second device address. Alternatively, the second device address may be stored and/or set to the registers 130-140.

The second target device 115 is coupled to the devices 105 and 110 through the serial data line 120 and the serial clock line 125. In some example implementations, the second target device 115 may be an integrated circuit, a sensor, a peripheral, etc. The second target device 115 may transmit data to the primary device 105 by driving the serial data line 120. The second target device 115 may receive data from the primary device 105 by monitoring the serial data line 120. The second target device includes a fifth register 150, a sixth register 155, a seventh register 160, and an eighth register 165. Alternatively, the second target device 115 may include any plurality of registers configured to store any plurality of bits. The second target device 115 is configured to store the first device address within the fifth register 150. For example, the fifth register 150 may be set to an 8-bit value representing the first device address. Alternatively, the device address may be stored and/or set to registers 155-165. The sixth register 155 may be configured to store a second UUID. For example, the sixth register 155 may be set to a 32-bit value representing the second UUID of the second target device 115. The seventh register 160 may be configured to store a second inverse UUID. The second inverse UUID is configured to be a bitwise NOT of the second UUID. For example, the seventh register 160 may be set to the inverse of the second UUID stored in the sixth register 155. Alternatively, the second inverse UUID may be stored and/or set to the registers 150, 155, and/or 165. The eighth register 165 may be configured to store the second device address. For example, the eighth register 165 may be set to an 8-bit value representing the second device address. Alternatively, the second device address may be stored and/or set to the registers 150-160.

Figure 2A:
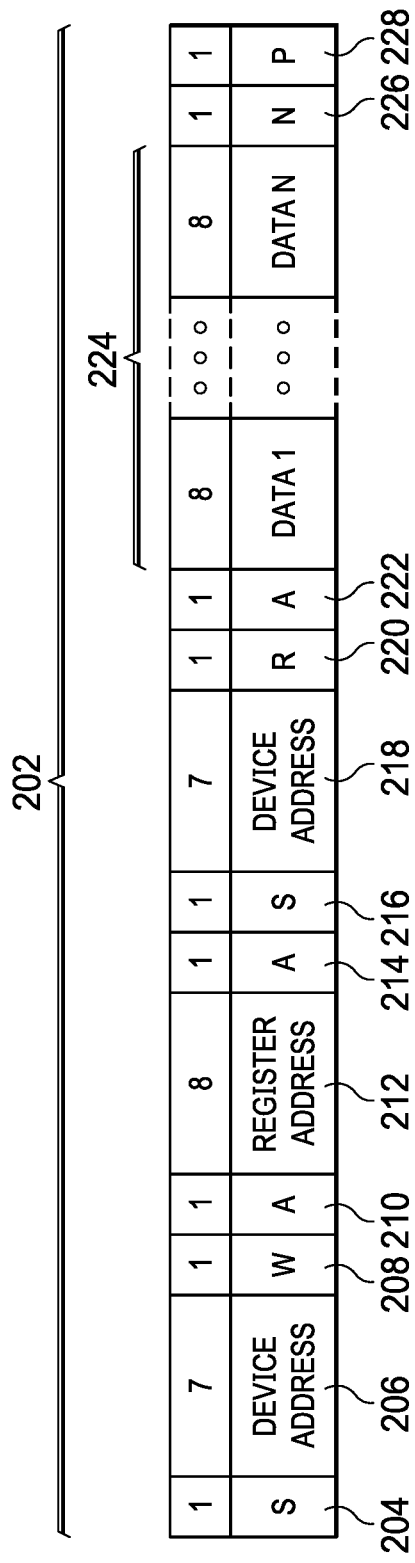
FIG. 2A is a diagram showing an example read command configured to read a value from a register of a target device.

FIG. 2A is a diagram showing an example read command 202 configured to read a value from a register of a target device. The read command 202 is configured to demonstrate an example data exchange between a primary device (e.g., the primary device 105 of FIG. 1) and a target device (e.g., the first target device 110 of FIG. 1, the second target device 115 of FIG. 1, etc.) across a serial data line (e.g., the serial data line 120 of FIG. 1). In order for the primary device to read a register value (e.g., the value stored and/or set in the registers 130-165), the primary device is configured to transmit the read command 202 including the device address of the target device, a register address corresponding to the register value, and an acknowledgment from the target device. The target device is configured to respond to the read command 202 by transmitting the value of the register identified in the read command 202.

In the example of FIG. 2A, the read command 202 includes an example first start bit 204, an example first device address 206, an example first indication bit 208, an example first acknowledge bit 210, an example first register address 212, a second acknowledge bit 214, a second start bit 216, a second device address 218, a second indication bit 220, a third acknowledge bit 222, an example first value 224, a fourth acknowledge bit 226, and an example stop bit 228. The primary device is configured to transmit and/or receive portions of the read command 202 across the serial data line, such that the primary device and the target device(s) may communicate by monitoring the serial data line. In the example of FIG. 2A, the read command 202 is configured to read the value of the register corresponding to the first register address 212 in the device corresponding to the device addresses 206 and 218 as the first value 224.

The read command 202 is begun by driving the serial data line to indicate the first start bit 204. The first start bit 204 is a one-bit transmission to indicate the start of a transmission. For example, the first start bit 204 may be transmitted by driving the serial data line 120 to a common potential (e.g., ground) based on an active low serial data line. The first start bit 204 is configured as a one-bit indication, such that the first start bit 204 has a duration of approximately one clock cycle of the serial clock line. Alternatively, the first start bit 204 may be indicated by the primary device driving the serial data line to a supply voltage.

The first start bit 204 is proceeded by the first device address 206. The first device address 206 is a plurality of bits configured to correspond to the device coupled to the serial data line that is intended to be accessed by the device driving the transmission. For example, the primary device 105 may communicate with the first target device 110 by driving the serial data line 120 to indicate the 7-bit device address of the first target device 110. The device driving the serial data line may transmit a message to a plurality of devices, coupled to the serial data line, responsive to the plurality of devices sharing a device address that is the same as the first device address 206.

The first device address 206 is proceeded by the first indication bit 208. The first indication bit 208 is a one-bit indication that the command is a read or write command. For example, the primary device 105 may drive the serial data line 120 to the supply voltage to indicate the read command 202 includes a write operation, or the primary device 105 may drive the serial data line 120 to the common potential to indicate the read command 202 is a read operation.

The first indication bit 208 is proceeded by the first acknowledge bit 210. The first acknowledge bit 210 is a one-bit transmission to indicate that the device specified by the first device address 206 received the first indication bit 208. For example, the first target device 110 may drive the serial data line 120 to the common potential as a result of the first device address 206 corresponding to the first target device 110.

The first acknowledge bit 210 is proceeded by the first register address 212. The first register address 212 is a plurality of bits to indicate a register within the device indicated by the first device address 206. For example, the primary device 105 may transmit a 7-bit value corresponding to the second register 135 of the first target device 110. Alternatively, the first register address 212 may correspond to any register comprising the device specified by the first device address 206.

The first register address 212 is proceeded by the second acknowledge bit 214. The second acknowledge bit 214 is a one-bit transmission to indicate that the device specified by the first device address 206 received the first register address 212. For example, the first target device 110 may drive the serial data line 120 to the common potential as a result of the first device address 206 corresponding to the first target device 110 and determining the first register address 212 is a valid register address. Alternatively, the device specified by the first device address 206 may drive the serial data line to the voltage supply to indicate an error in the first register address 212 or in the transmission of the I2C command. In the example of the read command 202, the first register address 212 is the value being written to the device corresponding to the first device address 206.

The second acknowledge bit 214 is proceeded by the second start bit 216. The second start bit 216 is a one-bit transmission to indicate the start of the transmission of a command. For example, the second start bit 216 may be transmitted by driving the serial data line 120 to a common potential (e.g., ground) based on an active low serial data line. The second start bit 216 is configured as a one-bit indication, such that the second start bit 216 has a duration of approximately one clock cycle of the serial clock line. Alternatively, some applications are configured for the second start bit 216 to be indicated by driving the serial data line 120 to a supply voltage.

The second start bit 216 is proceeded by the second device address 218. The second device address 218 is a plurality of bits configured to correspond to the device coupled to the serial data line that is intended to be accessed by the device driving the transmission. For example, the primary device 105 may communicate with the first target device 110 by driving the serial data line 120 to indicate the 7-bit device address of the first target device 110. The device driving the serial data line may transmit a value to a plurality of devices, coupled to the serial data line, as a result of the plurality of devices sharing a device address that is the same as the second device address 218.

The second device address 218 is proceeded by the second indication bit 220. The second indication bit 220 is a one-bit indication that the command is a read or write command. For example, the primary device 105 may drive the serial data line 120 to the supply voltage to indicate a write to the register or the primary device 105 may drive the serial data line 120 to the common potential to indicate a read operation to the register.

The second indication bit 220 is proceeded by the third acknowledge bit 222. The third acknowledge bit 222 is a one-bit transmission to indicate that the device specified by the second device address 218 received the second indication bit 220. For example, the first target device 110 may drive the serial data line 120 to the common potential as a result of the second device address 218 corresponding to the first target device 110.

The third acknowledge bit 222 is proceeded by the first value 224. The first value 224 is configured to be a plurality of bits representing the value of a register specified by the first register address 212 of the device of the first device address 206. For example, the first target device 110 may transmit a 32-bit value corresponding to the value of the second register 135 of the first target device 110. Alternatively, the first value 224 may be transmitted in 8-bit segments separated by an acknowledgment bit (e.g., the acknowledge bits 210, 214, and 222), such that the transmission of the first value 224 may be confirmed by the intended device. Advantageously, transmission of the first value 224 may be confirmed by the acknowledgment bits separating the first value 224.

The first value 224 is proceeded by the fourth acknowledge bit 226. The fourth acknowledge bit 226 is a one-bit transmission to indicate that the device specified by the second device address 218 received the second indication bit 220. For example, the first target device 110 may drive the serial data line 120 to the common potential as a result of the second device address 218 corresponding to the first target device 110. Alternatively, the acknowledge bits 228, and 248 may be referred to as not acknowledge (NACK) bits.

The fourth acknowledge bit 226 is proceeded by the stop bit 228. The stop bit 228 is a one-bit value representing the end of the read command 202. For example, the primary device 105 may drive the serial data line 120 to the supply voltage to indicate the end of the command.

Figure 2B:
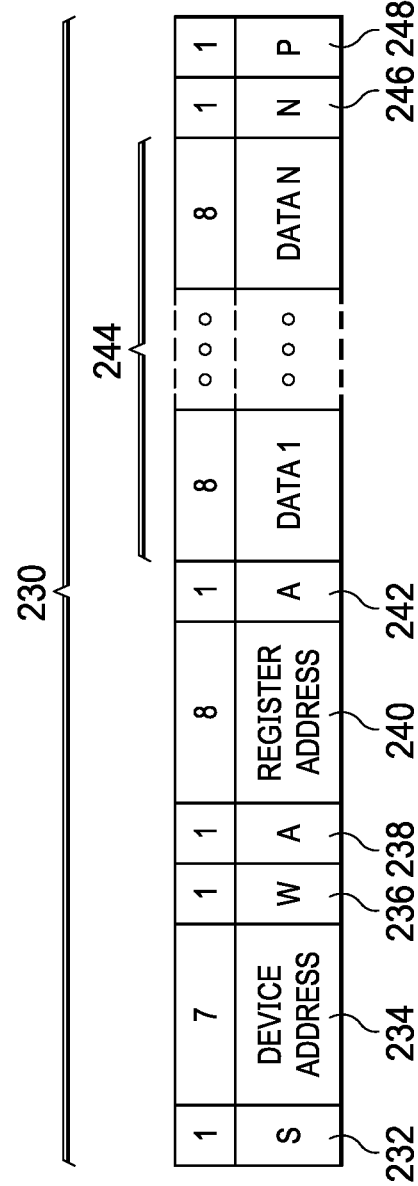
FIG. 2B is a diagram showing an example I2C write command configured to set a value of a register of a target device.

FIG. 2B is a diagram showing an example write command 230 configured to set a value of a register of a target device. The write command 230 is configured to demonstrate an example data exchange between a primary device (e.g., the primary device 105 of FIG. 1) and a target device (e.g., the first target device 110 of FIG. 1, the second target device 115 of FIG. 1, etc.) across a serial data line (e.g., the serial data line 120 of FIG. 1). In order for the primary device to write a register value (e.g., the value stored and/or set in the registers 130-165), the primary device is configured to transmit the write command 230 including the device address of the target device, a register address corresponding to the register in which the value is being written to, and an acknowledgment from the target device. The target device is configured to respond to the write command 230 by setting and/or storing the value of the register indicated by the write command 230.

In the example of FIG. 2B, the write command 230 includes a third start bit 232, a third device address 234, a third indication bit 236, a fifth acknowledge bit 238, a second register address 240, a sixth acknowledge bit 242, a second value 244, a seventh acknowledge bit 246, and a second stop bit 248. The primary device is configured to transmit and/or receive portions of the write command 230 across the serial data line, such that the primary device and the target device(s) may communicate by monitoring the serial data line.

The write command 230 is begun by driving the serial data line to indicate the third start bit 232. The third start bit 232 is a one-bit transmission to indicate the start of a transmission. For example, the third start bit 232 may be transmitted by driving the serial data line 120 to a common potential (e.g., ground) based on an active low serial data line. The third start bit 232 is configured as a one-bit indication, such that the third start bit 232 has a duration of approximately one clock cycle of the serial clock line. Alternatively, the third start bit 232 may be indicated by the primary device driving the serial data line to a supply voltage.

The third start bit 232 is proceeded by the third device address 234. The third device address 234 is a plurality of bits configured to correspond to the device coupled to the serial data line that is intended to be accessed by the device driving the transmission. For example, the primary device 105 may communicate with the first target device 110 by driving the serial data line 120 to indicate the 7-bit device address of the first target device 110. The device driving the serial data line may transmit a message to a plurality of devices, coupled to the serial data line, as a result of the plurality of devices sharing a device address that is the same as the third device address 234.

The third device address 234 is proceeded by the third indication bit 236. The third indication bit 236 is a one-bit indication that the write command 230 is a read or write command. For example, the primary device 105 may drive the serial data line 120 to the supply voltage to indicate the write command 230 is a write operation or the primary device 105 may drive the serial data line 120 to the common potential to indicate the write command 230 is a read operation.

The third indication bit 336 is proceeded by the fifth acknowledge bit 238. The fifth acknowledge bit 238 is a one-bit transmission to indicate that the device specified by the third device address 234 received the third indication bit 236. For example, the first target device 110 may drive the serial data line 120 to the common potential as a result of the third device address 234 corresponding to the first target device 110.

The fifth acknowledge bit 238 is followed by the second register address 240. The second register address 240 is a plurality of bits to indicate a register within the device indicated by the third device address 234. For example, the primary device 105 may transmit a 7-bit value corresponding to the value stored and/or set in the second register 135 of the first target device 110. Alternatively, the second register address 240 may correspond to any register comprising the device as specified by the third device address 234. The second register address 240 corresponds to the register associated with the value being written by the write command 230.

The second register address 240 is followed by the sixth acknowledge bit 242. The sixth acknowledge bit 242 is a one-bit transmission to indicate that the device specified by the third device address 234 received the second register address 240. For example, the first target device 110 may drive the serial data line 120 to the common potential as a result of the third device address 234 corresponding to the first target device 110 and the second register address 240 is determined to be in the first target device 110. Alternatively, the device specified by the third device address 234 may drive the serial data line to the voltage supply to indicate an error in the second register address 240 or in the transmission of the I2C command.

The sixth acknowledge bit 242 is followed by the second value 244. The second value 244 is configured to be a plurality of bits representing the value to be set and/or stored in a register specified by the second register address 240 of the device specified by the third device address 234. For example, the primary device 105 may transmit a 32-bit value to be stored in the second register 135 of the first target device 110. The second value 244 may be limited based on the register corresponding to the second register address 240. Alternatively, the second value 244 may be transmitted in 8-bit segments separated by an acknowledgment bit (e.g., the acknowledge bits 210, 214, and 222), such that the transmission of the second value 244 may be confirmed by the receiving device. Advantageously, transmission of the second value 244 may be confirmed by the acknowledgment bits separating the second value 244.

The second value 244 is proceeded by the seventh acknowledge bit 246. The seventh acknowledge bit 246 is a one-bit transmission to indicate that the device specified by the third device address 234 received, set, and/or stored the second value 244 in the register corresponding to the second register address 240. For example, the first target device 110 may drive the serial data line 120 to the common potential as a result of the third device address 234 corresponding to the first target device 110 and the value of the register corresponding to the second register address 240 is set to the second value 244. Alternatively, the acknowledge bits 238, 242, and 246 may be referred to as not acknowledge (NACK) bits.

The fourth acknowledge bit 226 is proceeded by the second stop bit 248. The second stop bit 248 is a one-bit value representing the end of the write command 230. For example, the primary device 105 may drive the serial data line 120 to the supply voltage to indicate the end of the command. Alternatively, the second stop bit 248 may be configured to be at the end of the write command 230.

Figure 3:
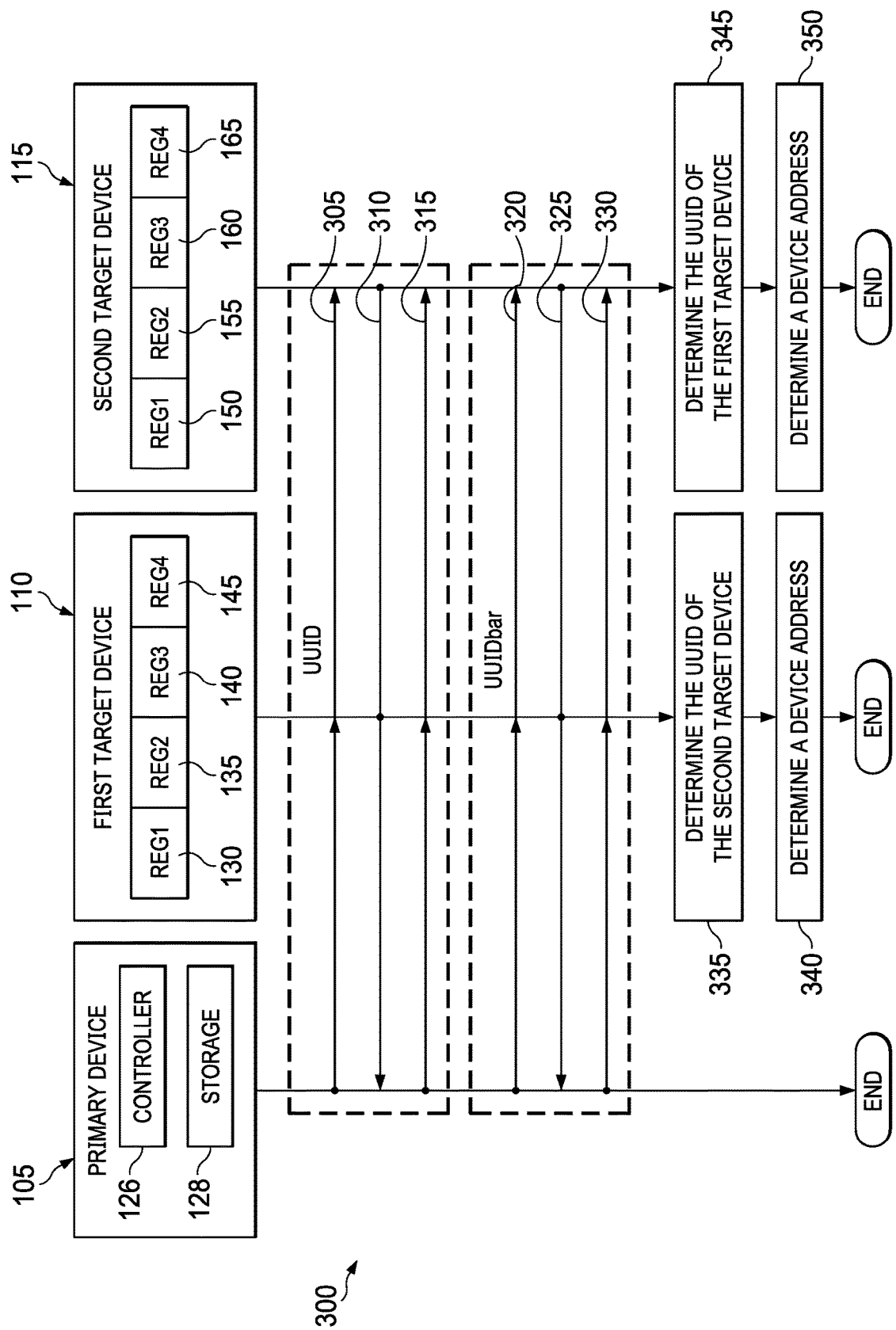
FIG. 3 is a communication diagram of an example exchange of commands to modify an example first device address of the first target device of FIG. 1 and/or a second device address of the second target device of FIG. 1.

FIG. 3 is a communication diagram 300 of an example exchange of commands to modify an example first device address of the first target device 110 of FIG. 1 and/or a second device address of the second target device 115 of FIG. 1. In the example of FIG. 3, the first device address of the first target device 110 and the second device address of the second target device 115 are configured to be a shared device address, such that a register (e.g., the registers 130-165) that is configured to store and/or set the device address is the same value in both of the target devices 110 and 115. In the example of FIG. 3, the communication diagram 300 includes an example first read request 305, an example first read value 310, a first write command 315, a second read request 320, a second read value 325, a second write command 330, and example blocks 335-360. The communication diagram 300 is configured to modify the device addresses of the devices 110 and/or 115 using the system 100 of FIG. 1 configured for I2C communication. The communication diagram 300 is configured to display the exchange of commands between the primary device 105 and the target devices 110 and 115. A read command (e.g., the read command 202 of FIG. 2A) may be comprised of a read request (e.g., the read requests 305 and 320) followed by a read value (e.g., the read values 310 and 325). The read request includes the bits 204-214 of the read command 202 of FIG. 2A, such that the primary device 105 may request to a value of a register corresponding to the first register address 212 of a device corresponding to the first device address 206. The read value includes bits 216-228 of the read command 202 of FIG. 2A, such that a device of a device address corresponding to the second device address 218 may transmit the value of the register corresponding to the first register address 212.

In the example of FIG. 3, the primary device 105 transmits the first read request 305 to the target devices 110 and 115 as a result of the first device address 206 being equal to the value of the shared device address. For example, the primary device 105 may transmit the first read request 305 by sending bits 204-214 to the target devices 110 and 115 by driving the serial data line 120 of FIG. 1, such that the first device address 206 is equal to the shared device address. The first read request 305 is includes the bits 204-214 of the read command 202. The first read request 305 is configured to request the target devices 110 and 115 transmit a value of a register corresponding to a register address (e.g., the first register address 212 of FIG. 2). The first read request 305 is configured to include a register address corresponding to a register configured to store and/or set the UUID of each of the target devices 110 and 115. For example, the primary device 105 transmits the first read request 305 including the device address of the target devices 110 and 115 and the register address of the registers 135 and 155 across the serial data line 120. Advantageously, the first read request 305 is received by all of the target devices configured to a device address equal to the shared device address.

The first read request 305 is proceeded by the first read value 310. The first read value 310 includes the bits 216-228 of the read command 202 of FIG. 2. The primary device 105 is configured to transmit the shared device address as the value of the second device address 218, such that the target devices 110 and 115 transmit the value of the register corresponding to the first register address 212 of the first read request 305. For example, the target devices 110 and 115 transmit the UUIDs stored and/or set in the registers 135 and 155 as a response to the primary device 105 transmitting the value stored in the registers 130 and 150 corresponding to the shared device address. Advantageously, the target devices 110 and 115 are configured to individually transmit the first value 224 of FIG. 2 during the same interval in response to the first read request 305. The serial data line 120 is configured as an active-low communication line, such that a logical AND of the data from each device is transmitted as the result of a plurality of devices are driving the serial data line 120. For example, the primary device 105 is configured for reading a logic low as the result of the first target device 110 driving the serial data line 120 to a common potential (e.g., ground) during the same interval in which the second target device 115 may drive the serial data line 120 to a supply voltage. Advantageously, the first value 224 of the first read request is equal to a logical AND of the UUIDs of the target devices 110 and 115.

The first read value 310 is proceeded by the first write command 315. The first write command 315 includes the bits 232-248 of the write command 230. The first write command 315 is configured to include the shared device address of the target devices 110 and 115 proceeded by a shared register address corresponding to a register to store the value representing the logical AND of the UUID of the first target device 110 and the UUID of the second target device 115 based on the first read value 310. For example, the primary device 105 transmits the logical AND of the UUIDs stored and/or set in the registers 135 and 155 as a response to the target devices 110 and 115 transmitting the UUIDs stored in the registers 135 and 155 of the target devices 110 and 115.

The first write command 315 is followed by the second read request 320. The second read request 320 is comprised of the bits 204-214 of the read command 202 of FIG. 2. The second read request 320 is configured to set a device address (e.g., the second device address 218 of FIG. 2) to the shared device address. The second read request 320 stores and/or sets a register address (e.g., the first register address 212 of FIG. 2) to a register configured to store and/or set the inverse UUID (UUIDbar) of each of the target devices 110 and 115. For example, the primary device 105 transmits the second read request 320 including the device address of the target devices 110 and 115 and the register address of the registers 140 and 160 across the serial data line 120.

The second read request 320 is followed by the second read value 325. The second read value 325 is comprised of the bits 216-228 of the read command 202 of FIG. 2. The primary device 105 transmits the device address for the target devices 110 and 115, such that the devices 110 and 115 transmit the value of the register configured to store and/or set the inverse UUID. For example, the target devices 110 and 115 transmit the inverse UUIDs stored and/or set in the registers 140 and 160 as a response to the primary device 105 transmitting the value stored in the registers 130 and 150 corresponding to shared device address. Advantageously, the target devices 110 and 115 are configured to transmit the inverse UUIDs during the same transmission. The serial data line 120 is configured as an active-low communication line, such that a logical AND of the data from each device is transmitted as the result of a plurality of devices are driving the serial data line 120. For example, the primary device 105 may read a logic low as the result of the first target device 110 driving the serial data line 120 to a common potential (e.g., ground) during the same interval in which the second target device 115 may drive the serial data line 120 to a supply voltage.

The second read value 325 is proceeded by the second write command 330. The second write command 330 includes the bits 232-248 of the write command 230. The second write command 330 is configured to include the shared device address of the target devices 110 and 115 proceeded by a register address corresponding to a register to store the value representing the logical AND of the inverse UUID of the first target device 110 and the inverse UUID of the second target device 115 from the second read value 325. For example, the primary device 105 transmits the logical AND of the inverse UUIDs stored and/or set in the registers 140 and 160 as a response to the target devices 110 and 115 transmitting the UUIDs stored and/or set in the registers 140 and 160 of the target devices 110 and 115.

Advantageously, the commands 305-330 are configured to provide the logical AND of the UUIDs and inverse UUIDs of the target devices 110 and 115 to both target devices 110 and 115. Alternatively, the commands 305-330 may be configured to include additional commands including additional example read and/or write commands to access a plurality of registers.

At block 335, the first target device 110 determines the UUID of the second target device 115. The first target device 110 may determine the UUID of the second target device 115 by comparing the logical AND of the UUIDs (the value transmitted during the first write command 315) and/or the logical AND of the inverse UUIDs (the value transmitted during the second write command 330) to the first UUID stored and/or set in the register 135 and/or the first inverse UUID stored and/or set in the register 140. The first target device 110 may determine each bit of the UUID of the second target device 115 by determining the possible values of each bit to be a logic 0, a logic 1, or undeterminable. For example, the first target device 110 may determine the first bit of the UUID of the second target device 115 to be a logic 0 as the result of the first bit of the UUID of the first target device 110 determined to be a logic 1 and a first bit of the logical AND of the UUIDs determined to be a logic 0.

The first target device 110 may be configured to compare the bits of the UUIDbar of the first target device 110 to the logical AND of the UUIDbars as the result of determining the possible value of a bit is undeterminable. For example, the first target device 110 may determine a second bit of the UUID of the second target device 115 to be a logic 1 as the result of the second bit of the UUID of the first target device 110 being a logic 0 and the second bit of the logical AND of the UUIDbars being a logic 0. Alternatively, the first target device 110 may determine a second bit of the UUID of the second target device 115 to be a logic 1 as the result of the second bit of the UUIDbar of the first target device 110 being a logic 1 and the second bit of the logical AND of the UUIDbars being a logic 0. Such possible values of the second bit of the UUID of the second target device 115 is undeterminable based on comparing the logical AND of the UUIDs and the UUID of the first target device 110. Advantageously, the first target device 110 may determine the UUID of the second target device 115 by comparing the logical AND of the UUIDs and the logical AND of the inverse UUIDs. The block 335 is proceeded by block 340.

At block 340, the first target device 110 determines a device address. The first target device 110 may determine to modify the device address stored and/or set in the first register 130. For example, the first target device 110 may be configured to set the value of the first register 130 to a new device address stored and/or set in the fourth register 145 as the result of the UUID of the second target device 115 being greater than the UUID of the first target device 110. Alternatively, the target devices 110 and 115 may determine to modify the device address based on any comparison of the UUIDs of the target devices 110 and 115. Advantageously, the target devices 110 and 115 are configured to determine and set the device addresses stored and/or set in the registers 130 and 150, such that the target devices 110 and 115 may receive commands individually.

At block 345, the second target device 115 determines the UUID of the first target device 110. The second target device 115 may determine the UUID of the first target device 110 by comparing the logical AND of the UUIDs (the value transmitted during the first write command 315) and/or the logical AND of the inverse UUIDs (the value transmitted during the second write command 330) to the first UUID stored and/or set in the sixth register 155 and the first inverse UUID stored and/or set in the seventh register 160. The second target device 114 may determine each bit of the UUID of the first target device 110 by determining the possible values of each bit to be a logic 0, a logic 1, or undeterminable. For example, the second target device 115 may determine the first bit of the UUID of the first target device 110 to be a logic 0 as the result of the first bit of the UUID of the second target device 115 determined to be a logic 1 and a first bit of the logical AND of the UUIDs determined to be a logic 0.

The second target device 115 may be configured to compare the bits of the UUIDbar of the second target device 115 to the logical AND of the UUIDbars as the result of the determining the possible value of a bit is undeterminable. For example, the second target device 115 may determine a second bit of the UUID of the first target device 110 to be a logic 1 as the result of the second bit of the UUID of the second target device 115 being a logic 0 and the second bit of the logical AND of the UUIDbars being a logic 0. Such possible values of the second bit of the UUID of the first target device 110 is undeterminable based on comparing the logical AND of the UUIDs and the UUID of the second target device 115. Advantageously, the second target device 115 may determine the UUID of the first target device 110 by comparing the logical AND of the UUIDs and the logical AND of the inverse UUIDs. The block 345 is proceeded by block 350.

At block 350, the second target device 115 determines a device address. The second target device 115 may determine to modify the device address stored and/or set in the fifth register 150. For example, the second target device 115 may be configured to set the value of the fifth register 150 to a new device address stored and/or set in the eighth register 165 as the result of the UUID of the first target device 110 being greater than the UUID of the second target device 115. Alternatively, the target devices 110 and 115 may determine to modify the device address based on any comparison of the UUIDs of the target devices 110 and 115. Advantageously, the second target device 115 is configured to determine and set the device address stored and/or set in the fifth register 150, such that the target devices 110 and 115 may receive commands individually. Advantageously, the target devices 110 and 115 may modify each device address without an additional coupling.

Although example methods are described with reference to FIG. 3, many other methods may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Alternatively, the method described in FIG. 3 may be modified to account for three or more target devices. For example, the method of FIG. 3 may be implemented with three devices with a shared device address coupled to the same I2C bus, such that the method of FIG. 3 is repeated twice to determine the largest two UUIDs. In some such examples, the method of FIG. 3 may be implemented a first time to configure the first device (e.g., the one with the largest UUID) to have an individual device address before repeating the method of FIG. 3 to determine a second individual device address for the second device (e.g., the one with the $2^{nd}$ largest UUID), such that the device with the lowest UUID may still respond to the shared device address. Advantageously, the method of FIG. 3 may be modified to configure the device addresses of two or more device addresses.

Figure 4:
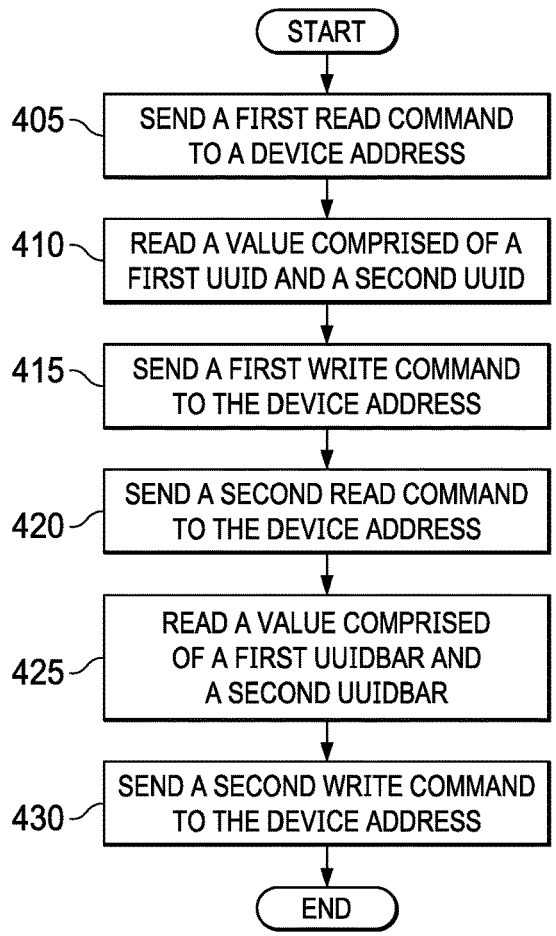
FIG. 4 is a flowchart representative of an example process that may be performed using machine readable instructions that can be executed and/or hardware configured to implement the primary device of FIG. 1 to perform the exchange of commands of FIG. 3.

FIG. 4 is a flowchart representative of an example process that may be performed using machine readable instructions that can be executed and/or hardware configured to implement the primary device 105 of FIG. 1 to do the exchange of commands of FIG. 3. In the example of FIG. 4, the process is configured to exchange I2C commands between a primary device (e.g., the primary device 105 of FIGS. 1 and 3) and a plurality of target devices (e.g., the target devices 110 and 115 of FIGS. 1 and 3), such that the target devices start with a shared device address and end with individual device addresses. The process starts at block 405.

At block 405, the primary device sends a first read command to a device address. The first read command is configured based on the read command 202 of FIG. 2, such that the first device address 206 of FIG. 2 is the shared device address of the target devices and the first register address 212 of FIG. 2 is the register address of the register in the target devices configured to store and/or set the UUID. For example, the first read request 305 of FIG. 3 includes the device address of registers 130 and 150 and a register address corresponding to the registers 135 and 155, such that the registers 135 and 155 are configured to store the target device UUID. The primary device may send the first read command to the device address by driving a serial data line (e.g., the serial data line 120 of FIG. 1), such that the serial data line is coupled to the target devices. The process proceeds to block 410.

At block 410, the primary device reads a logical AND of a first UUID and a second UUID. The primary device may read a logical AND of the first UUID from a first target device (e.g., the first target device 110) and the second UUID from a second target device (e.g., the second target device 115) as the result of the first read command at block 405 and the transmission of the shared device address (e.g., the second device address 218 of FIG. 2) on the serial data line. The read at block 410 may be configured similar to the bits 216-228 of the read command 202 of FIG. 2. For example, the first read value 310 of FIG. 3 includes the shared device address followed by the logical AND of the UUID of the first target device 110 and the UUID of the second target device 115. Advantageously, the target devices drive the serial data line at the same time, such that the primary device reads the logical AND of the values from the target devices. The process proceeds to block 415.

At block 415, the primary device sends a first write command to the device address. The first write command is configured similar to the write command 330 of FIG. 3, such that the primary device transmits the value representing the logical AND of the UUIDs to the shared device address as the second value 244 of FIG. 2. For example, the primary device 105 drives the serial data line to transmit the shared device address followed by the value representing the logical AND of the UUIDs of the target devices 110 and 115. Advantageously, the primary device may transmit the logical AND of the UUIDs of the target devices to all target devices in a single command. Alternatively, the primary device may be configured to send the first write command at any point after block 405 and 410. The process proceeds to block 420.

At block 420, the primary device sends a second read command to the device address. The second read command is configured based on the read command 202, such that the first device address 206 is the shared device address of the target devices and the first register address 212 is the register address of the register in the target devices configured to store and/or set the inverse UUID. For example, the second read request 320 of FIG. 3 includes the device address of registers 130 and 150 and a register address corresponding to the registers 140 and 160, such that the registers 140 and 160 are configured to store the target device inverse UUID. The process proceeds to block 425.

At block 425, the primary device reads a logical AND of a first UUIDbar and a second UUIDbar. The primary device may read a logical AND of the first UUIDbar from the first target device and the second UUID from the second target device as the result of the second write command at block 420 and the transmission of the shared device address (e.g., the second device address 218) on the serial data line. The read performed at block 425 may be configured similar to the bits 216-228 of the read command 202 of FIG. 2. For example, the second read value 325 of FIG. 3 includes the shared device address followed by the logical AND of the UUIDbar of the first target device 110 and the UUIDbar of the second target device 115. Advantageously, the target devices drive the serial data line at the same time, such that the primary device reads the logical AND of the values from both target devices. The process proceeds to block 430.

At block 430, the primary device sends a second write command to the shared device address. The second write command is configured similar to the write command 330 of FIG. 3, such that the primary device transmits the value representing the logical AND of the UUIDbars to the shared device address as the second value 244. For example, the primary device 105 drives the serial data line to transmit the shared device address followed by the value representing the logical AND of the UUIDbars of the target devices 110 and 115. Advantageously, the primary device may transmit the logical AND of the UUIDbars of the target devices to all target devices in a single command. The process ends. Alternatively, the primary device may send the second write command of block 430 at any point after the blocks 420 and 425.

Although example methods are described with reference to the flowchart illustrated in FIG. 4, many other methods may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 5:
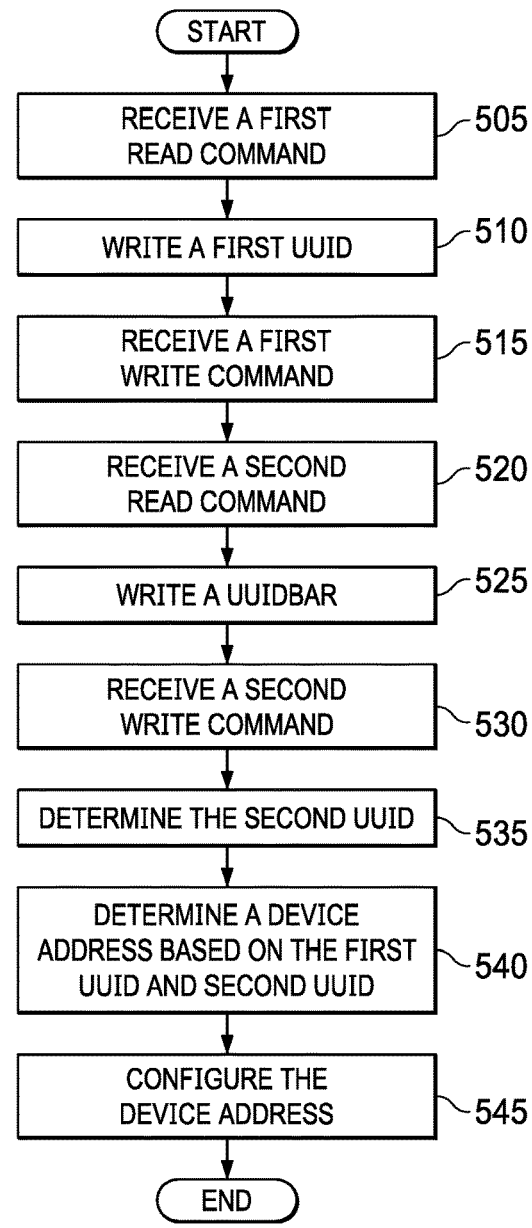
FIG. 5 is a flowchart representative of an example process that may be performed using machine readable instructions that can be executed and/or hardware configured to implement the first target device and/or the second target device of FIG. 1 to perform the exchange of commands of FIG. 3.

FIG. 5 is a flowchart representative of an example process that may be performed using machine readable instructions that can be executed and/or hardware configured to implement the first target device of FIG. 1, and/or, the second target device of FIG. 1 to do the exchange of commands of FIG. 3. In the example of FIG. 5, the process is configured to exchange I2C commands between a primary device (e.g., the primary device 105 of FIGS. 1 and 3) and a plurality of target devices (e.g., the target devices 110 and 115 of FIGS. 1 and 3), such that the target devices start with a shared device address and end with individual device addresses. The process starts at block 505.

At block 505, the target device receives a first read command. The first read command is configured based on the bits 204-214 of the read command 202 of FIG. 2, such that the first device address 206 of FIG. 2 is the shared device address of the target devices and the first register address 212 of FIG. 2 is the register address of the register in the target devices configured to store and/or set the UUID. For example, the first read request 305 of FIG. 3 includes the device address of registers 130 and 150 and a register address corresponding to the registers 135 and 155, such that the registers 135 and 155 are configured to store the target device UUID. The target device may read and/or send I2C commands to the device address by driving a serial data line (e.g., the serial data line 120 of FIG. 1), such that the serial data line is coupled to a separate target device and the primary device. The process proceeds to block 510.

At block 510, the target device writes a first UUID. The write at block 510 may be configured similar to the bits 216-228 of the read command 202 of FIG. 2, such that the first value 224 of FIG. 2 is the first UUID of the target device. For example, the first target device 110 writes the value of the second register 135 of FIG. 1 as the response to receiving the shared device address as part of the first read value 310 of FIG. 3. The blocks 505 and 510 comprise the first read command configured to include bits 204-228 of the read command 202 of FIG. 2. Advantageously, the target devices may drive the serial data line at the same time, such that the primary device reads the logical AND of the values from the target devices. The process proceeds to block 515.

At block 515, the target device receives a first write command. The first write command is configured similar to the first write command 315 of FIG. 3, such that the primary device transmits the value representing the logical AND of the UUIDs to the shared device address. For example, the target device receives the value representing the logical AND of the UUIDs of the target devices 110 and 115. Advantageously, the target devices may receive the logical AND of the UUIDs of the target devices within in a single command. The process proceeds to block 520.

At block 520, the target device receives a second read command. The second read command is configured based on the bits 204-214 of the read command 202, such that the first device address 206 is the shared device address of the target devices and the first register address 212 is the register address of the register in the target devices configured to store and/or set the inverse UUID. For example, the second read request 320 of FIG. 3 includes the device address of registers 130 and 150 and a register address corresponding to the registers 140 and 160, such that the registers 140 and 160 are configured to store the target device inverse UUID. The process proceeds to block 525.

At block 525, the target device writes a UUIDbar. The write at block 525 may be configured similar to the read command 202 of FIG. 2. For example, the second read value 325 of FIG. 3 includes the shared device address followed by the logical AND of the UUIDbar of the first target device 110 and the UUIDbar of the second target device 115. The blocks 520 and 525 comprise the second read command configured to include bits 204-228 of the read command 202 of FIG. 2. Advantageously, the target devices write the UUIDbar values on the serial data line at the same time, such that the primary device may read the logical AND of the values from both target devices. The process proceeds to block 530.

At block 530, the target device receives a second write command. The second write command is configured similar to the write command 330 of FIG. 3, such that the target device receives the value representing the logical AND of the UUIDbars. For example, the primary device 105 drives the serial data line to transmit the shared device address followed by the value representing the logical AND of the UUIDbars of the target devices 110 and 115. Advantageously, the target devices receive the logical AND of the UUIDbars of the target devices to within a single command. The process proceeds to block 535.

At block 535, the target device determines the second UUID. The target device may determine the second UUID similar to the method described in blocks 335 and 345 of FIG. 3, such that the target device may determine the UUID of the separate target device. For example, the first target device 110 determines the UUID of the second target device 115 based on determining the possible values of each bit of the UUID of the second target device 115 by comparing the UUID of the first target device 110 to the logical AND of the UUIDs of the target devices 110 and 115. Advantageously, the target devices may determine another target devices UUID without sending the separate target device commands. The process proceeds to block 540.

At block 540, the target device determines a device address based on the first UUID and the second UUID. The target device compares the first UUID to the second UUID similar to the method described in blocks 340 and 350 of FIG. 3, such that the target device may determine whether or not the device address of the target device is to be modified. For example, the first target device 110 may modify the device address of the first target device 110 to a new device address as the result of determining the UUID of the second target device 115 is greater than the UUID of the first target device 110. The process proceeds to block 545.

At block 545 the target device configures the device address. For example, the first target device 110 may modify the value of a register corresponding to the device address as a result of comparing the first UUID and the second UUID. Advantageously, the target devices coupled to the serial data line include individual device addresses, such that the primary device may send and/or receive I2C commands to each target device individually.

Although example methods are described with reference to the flowchart illustrated in FIG. 5, many other methods may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 6:
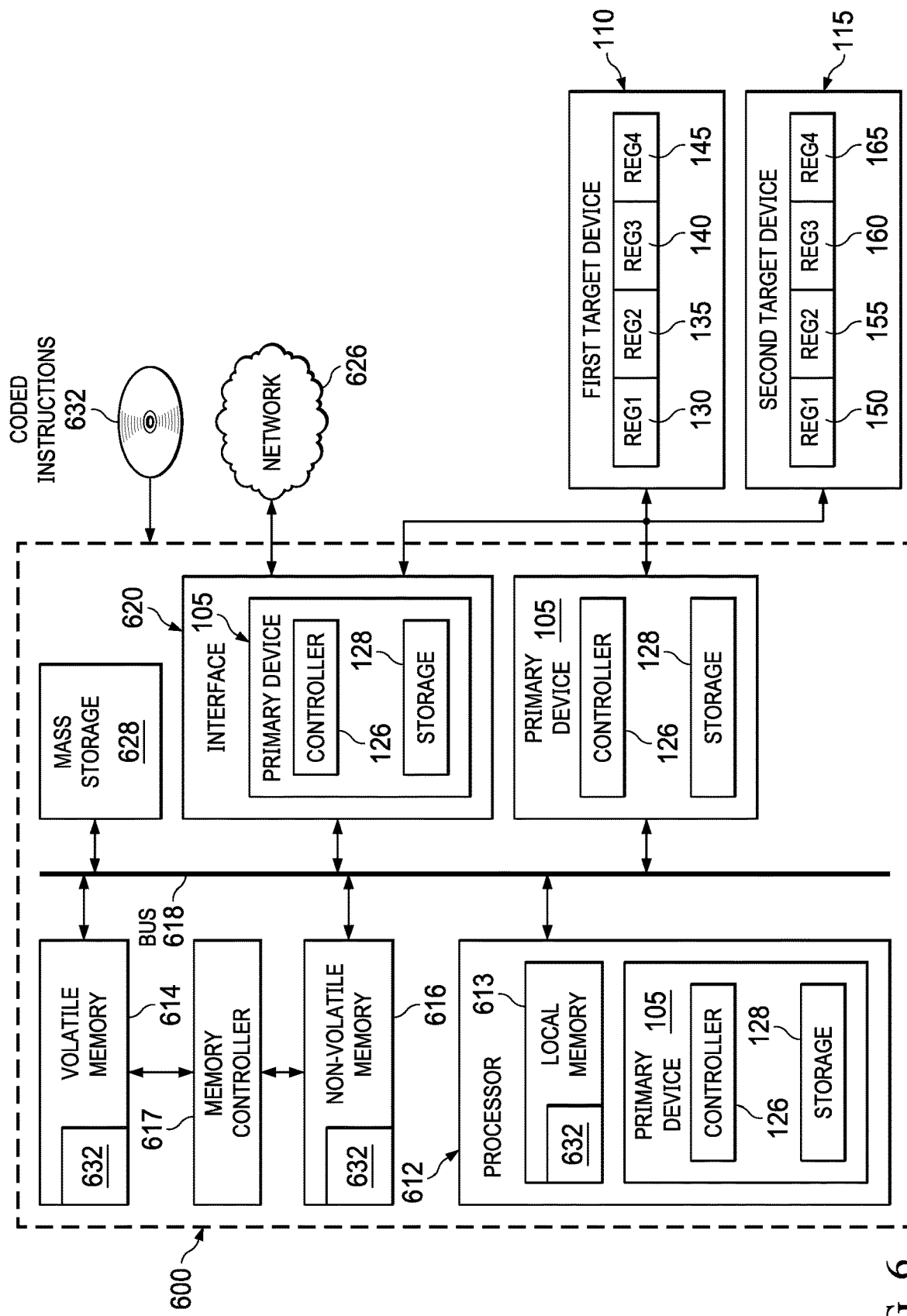
FIG. 6 is a block diagram of an example processing platform including processor circuitry structured to execute the example machine readable instructions and/or the example operations of FIGS. 4 and 5 to implement the device address modification of FIGS. 1 and 3.

FIG. 6 is a block diagram of an example processing platform including processor circuitry structured to execute the example machine readable instructions and/or the example operations of FIGS. 4 and 5 to implement the device address modification of FIGS. 1 and 3 using commands of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices.

The processor circuitry 612 of the illustrated example includes a local memory 613 (e.g., a cache, registers, etc.). The processor circuitry 612 of the illustrated example is in communication with a main memory including a volatile memory 616 and a non-volatile memory 616 by a bus 618. The volatile memory 616 may be implemented by synchronous dynamic random access memory (SDRAM), dynamic random access memory (DRAM), RAMBUS® dynamic random access memory (RDRAM®), and/or any other type of RAM device. The non-volatile memory 616 may be implemented by flash memory and/or any other desired type of memory device. Access to the main memory 616, 616 of the illustrated example is controlled by a memory controller 617. Alternatively, the primary device 105 of FIGS. 1 and 3 may be included in the processor circuitry 612.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In the example of FIG. 6, the primary device 105 is included in the interface circuitry 620. Alternatively, the primary device 105 may be included in the processor platform 600.

In the illustrated example, the target devices 110 and 115 are connected to the interface circuitry 620. The target devices 110 and 115 are configured to communicate with the interface circuitry 620 using I2C protocol. The target devices 110 and 115 can be implemented as peripheral device (e.g., a sensor, electrically erasable programmable read-only memory (EEPROM), a receiver, etc.) capable of I2C communication.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 626 are also connected to the interface circuitry 620 of the illustrated example. The output device(s) 626 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 632, which may be implemented by the machine-readable instructions of FIGS. 4 and 5, may be stored in the mass storage device 628, in the volatile memory 616, in the non-volatile memory 616, and/or on a removable non-transitory computer readable storage medium such as a CD or DVD.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type field effect transistor ("PFET") may be used in place of an n-type field effect transistor ("NFET") with little or no changes to the circuit. Furthermore, other types of transistors may be used (such as bipolar junction transistors ("BJTs")).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. A system comprising:
   a first device having a terminal, the first device configured to:
      send a first command at the terminal, the first command including a first address;
      after sending the first command, receive a first value at the terminal, the first value comprising a bitwise logical AND of a first identifier of a second device and a second identifier of a third device;
      responsive to receiving the first value, send, at the terminal, a second command including the first address and an indication of the first value;
      send a third command at the terminal, the third command including the first address;
      after sending the third command, receive a second value at the terminal, the second value comprising a bitwise logical AND of a third identifier of the first device and a fourth identifier of the third device; and
      responsive to receiving the second value, send a fourth command at the terminal, the fourth command including the first address and an indication of the second value.

2. The system of claim 1, wherein the first command is a read command including a register address of a first register of the second device and a register address of a second register of the third device.

3. The system of claim 1, wherein the second command is a write command including a register address of a register of the second device and a register address of a register of the third device.

4. The system of claim 1, wherein the system further comprises:
   the second device;
   the third device;
   a data line coupled to the terminal, to the second device, and to the third device; and
   a clock line coupled to the first device, the second device, and the third device.

5. The system of claim 1, wherein the first device is configured to communicate using inter-integrated circuit (I2C) protocol.

6. The system of claim 1, wherein the first address is a device address shared by the second device and the third device, and the second device and the third device are configured to receive and send commands at the same time.

7. The system of claim 1, wherein the first device is further configured to:
   send a fifth command at the terminal, the fifth command including a second address; and
   after sending the fifth command, receive a seventh value at the terminal.

8. A system comprising:
   a first device including a first register, a second register, and a terminal, the first device configured to:
      receive a first read command at the terminal;
      responsive to receiving the first read command at the terminal, send a first identifier of the first device at the terminal;
      receive a first write command, comprising a first value, at the terminal;
      responsive to receiving the first write command at the terminal, store the first value in the first register, wherein the first value is a logical AND of the first identifier of the first device and a second identifier of a second device;
      receive a second read command at the terminal;
      after receiving the second read command at the terminal, send, at the terminal, an inverse of the first identifier;
      receive a second write command, comprising a second value, at the terminal;
      responsive to receiving the second write command at the terminal, storing the second value in the second register, wherein the second value is a logical AND of the inverse of the first identifier of the first device and an inverse of the second identifier of the second device; and
      determine a third identifier of the second device based on the first value and the second value.

9. The system of claim 8, wherein the first device is further configured to communicate with the second device using inter-integrated circuit (I2C) protocol.

10. The system of claim 8, wherein the first read command includes a register address of a third register of the first device, the third register is configured to store the first identifier of the first device.

11. The system of claim 8, wherein the first identifier is different from the second identifier, and a value representing the first identifier and the second identifier is determined to be stored in a third register of a shared register address.

12. The system of claim 8, wherein the first device is configured to compare the first identifier to the second identifier to determine a device address of the second device based on the comparison.

13. The system of claim 8, wherein the second read command includes a register address of a third register configured to store the inverse of the first identifier of the first device.

14. The system of claim 8, wherein the first identifier is a first universally unique identifier (UUID) of the first device and the second identifier is a second UUID of the second device.

15. A method comprising:
- receiving, by a first device, at a terminal, a first write command comprising a first value;
- responsive to receiving the first write command, storing, by the first device, the first value in a first register, wherein the first value is a logical AND of a first identifier of the first device and a second identifier of a second device;
- receiving, by the first device at the terminal, a second write command comprising a second value;
- responsive to receiving the second write command, storing, by the first device, the second value in a second register, wherein the second value is a logical AND of an inverse of the first identifier of the first device and an inverse of the second identifier of the second device; and
- determining, by the first device, a third identifier of the second device based on the first value and the second value.

16. The method of claim 15, further comprising:
- responsive to receiving, by the first device, a first read command, transmitting the first identifier; and
- responsive to receiving, by the first device, a second read command, transmitting the inverse of the first identifier.

17. The method of claim 16, wherein the first identifier is a universally unique identifier (UUID).

18. The method of claim 16, further comprising:
- reading the first identifier from a third register; and
- reading the inverse of the first identifier from a fourth register.

19. The method of claim 15, wherein determining the third identifier comprises:
- determining the second identifier based on the first identifier, the first value, and the second value; and
- determining the third identifier based on a comparison of the first identifier and the second identifier.

20. The method of claim 15, further comprising storing the third identifier in a register.

* * * * *